US011132480B2

(12) United States Patent
Okuda et al.

(10) Patent No.: US 11,132,480 B2
(45) Date of Patent: Sep. 28, 2021

(54) ELECTROMAGNETIC FIELD SIMULATOR, METHOD FOR OPERATING ELECTROMAGNETIC FIELD SIMULATOR, AND NON-TRANSITORY COMPUTER READABLE MEDIUM

(71) Applicant: PANASONIC INTELLECTUAL PROPERTY MANAGEMENT CO., LTD., Osaka (JP)

(72) Inventors: Toshihiro Okuda, Tokyo (JP); Makoto Sasaki, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 323 days.

(21) Appl. No.: 16/352,151

(22) Filed: Mar. 13, 2019

(65) Prior Publication Data
US 2019/0286767 A1 Sep. 19, 2019

(30) Foreign Application Priority Data
Mar. 16, 2018 (JP) .............................. JP2018-050074

(51) Int. Cl.
*G06F 30/20* (2020.01)
*G06F 111/10* (2020.01)

(52) U.S. Cl.
CPC .......... *G06F 30/20* (2020.01); *G06F 2111/10* (2020.01)

(58) Field of Classification Search
CPC .. H01Q 3/30; H01Q 1/46; G06F 30/20; G06F 2111/10; G04R 60/10
See application file for complete search history.

(56) References Cited

U.S. PATENT DOCUMENTS

| 5,745,370 | A | 4/1998 | Ohtsu et al. |
| 9,323,877 | B2 * | 4/2016 | Ng ........................ G06F 30/39 |
| 10,485,094 | B1 * | 11/2019 | Isohatala ............... G06F 3/0445 |
| 10,551,346 | B2 * | 2/2020 | Nishimura ............. G01N 27/62 |

(Continued)

FOREIGN PATENT DOCUMENTS

| JP | 07-302278 | 11/1995 |
| JP | 2010-198201 | 9/2010 |

*Primary Examiner* — Thai Q Phan
(74) *Attorney, Agent, or Firm* — Greenblum & Bernstein, P.L.C.

(57) ABSTRACT

An electromagnetic field simulator performs: a model creation information extraction process; a model automatic creation process; and an electromagnetic field analysis process. The model creation information extraction process includes: obtaining evaluation frequency information that includes an evaluation frequency for an apparatus suffering noise; obtaining target material information of a determination target; determining whether a conductive component is present in the obtained target material information; and determining the conductive component as having an antenna operating portion that operates as an antenna if the conductive component is present in the obtained target material information. The model automatic creation process includes: creating the model to have a simplified shape except for the component to be determined determined as having the antenna operation portion of the component. The electromagnetic field analysis process includes: performing electromagnetic field analysis on the created model.

14 Claims, 10 Drawing Sheets

(56) References Cited

U.S. PATENT DOCUMENTS

| | | | |
|---|---|---|---|
| 10,629,994 B2* | 4/2020 | Henry | H01P 5/103 |
| 10,635,778 B2* | 4/2020 | Hiraga | B60R 16/0207 |
| 2008/0064331 A1* | 3/2008 | Washiro | H04B 5/0012 |
| | | | 455/41.1 |
| 2011/0320995 A1 | 12/2011 | Osaka et al. | |
| 2013/0275111 A1 | 10/2013 | Osaka et al. | |
| 2015/0338831 A1* | 11/2015 | Aizawa | G04R 60/10 |
| | | | 368/47 |
| 2017/0093693 A1* | 3/2017 | Barzegar | H01Q 1/2291 |
| 2017/0270237 A1* | 9/2017 | Hiraga | B60R 16/0207 |
| 2018/0159195 A1* | 6/2018 | Henry | H01P 3/16 |
| 2018/0167148 A1* | 6/2018 | Vannucci | H01Q 13/28 |
| 2018/0294897 A1* | 10/2018 | Vannucci | H01Q 1/46 |
| 2018/0331721 A1* | 11/2018 | Adriazola | H01Q 1/12 |
| 2019/0140938 A1* | 5/2019 | Barzegar | H01Q 3/30 |
| 2019/0319362 A1* | 10/2019 | Johnson | H01Q 3/30 |
| 2020/0176884 A1* | 6/2020 | Kirino | H01P 5/10 |

* cited by examiner

ELECTROMAGNETIC FIELD SIMULATOR, METHOD FOR OPERATING ELECTROMAGNETIC FIELD SIMULATOR, AND NON-TRANSITORY COMPUTER READABLE MEDIUM

FIELD

The present invention relates to an electromagnetic field simulator suitably used for design of an electronic apparatus, a method for operating the electromagnetic field simulator, and a non-transitory computer readable medium.

BACKGROUND

In the background art, there are a method for creating a model in which only metal portions are reflected from mechanism computer-aided design (CAD) or board data, and performing electromagnetic field analysis on the model, and a method for inputting all pieces of design information of mechanism CAD, board data, etc., converting electromagnetic coupling into an equivalent circuit, and analyzing the circuit. For example, a method described in JP-A-H07-302278 is provided as the former electromagnetic field analysis method. On the other hand, a method described in JP-A-2010-198201 is provided as the latter circuit analysis method. Incidentally, the mechanism CAD means three-dimensional CAD information such as design data using CAD for a housing, various components, etc. constituting an electronic apparatus.

JP-A-H07-302278 discloses a technique for accurately inputting structures of printed boards, cables, leads and metal housings belonging to an electric circuit apparatus, and calculating electromagnetic field intensity with high accuracy. JP-A-2010-198201 discloses a technique for extracting a main path of propagation of electric energy, creating an equivalent circuit of the main path, and calculating a radiation electric field by circuit analysis.

SUMMARY

However, in the electromagnetic field analysis method described in JP-A-H07-302278, a calculation amount increases due to enlargement of an analysis space, and analysis is therefore difficult by a general-purpose PC (Personal Computer). In addition, disposition of the structures constituting the electronic apparatus can be improved, but an IC (Integrated Circuit), an oscillator, or the like acting as a noise source cannot be optimally disposed on a printed board.

In the circuit analysis method described in JP-A-2010-198201, details of the circuit configuration of the printed board, a wiring mode of a cable, etc. have to be reflected on simulation conditions in order to calculate an accurate EMI (Electro Magnetic Interference) level in a condition that a propagation path of a noise current cannot be specified in advance. However, in the simulation in which the detailed conditions have been reflected, there is a problem that time is required for creation of a model, to thereby cause an increase in calculation cost.

An object of the present disclosure is to provide an electromagnetic field simulator that can easily create an analysis model analyzable even by a general-purpose PC, and a method for operating the electromagnetic field simulator, and a non-transitory computer readable medium.

The present disclosure provides an electromagnetic field simulator connectable to an input device and a display device, the electromagnetic field simulator including a processor and a memory storing a computer program that, when executed by the processor, performs: a model creation information extraction process of extracting information for creation of a model; a model automatic creation process of creating the model based on the extracted information; and an electromagnetic field analysis process of performing electromagnetic field analysis on the created model, wherein the model creation information extraction process includes: obtaining evaluation frequency information that includes an evaluation frequency for an apparatus suffering noise; obtaining noise frequency information that includes a noise frequency for a component acting as a noise source; obtaining target material information of a determination target; determining whether or not a conductive component is present in the obtained target material information; determining the conductive component as having an antenna operating portion that operates as an antenna if the conductive component is present in the obtained target material information; determining whether or not a division or multiplication of the noise frequency obtained by dividing or multiplying the noise frequency by any integer corresponds to the evaluation frequency; and determining the noise source as a noise source for creation of the model if the division or multiplication of the noise frequency corresponds to the evaluation frequency, wherein the model automatic creation process includes: determining whether or not a component to be determined is the conductive component determined as having the antenna operating portion; and creating the model to have a simplified shape except for the component to be determined if the component to be determined is the component determined as having the antenna operating portion, and wherein the electromagnetic field analysis process includes: performing electromagnetic field analysis on the created model.

The present disclosure provides a method for operating an electromagnetic field simulator connectable to an input device and a display device, the method including: performing a model creation information extraction process of extracting information for creation of a model; performing a model automatic creation process of creating the model based on the extracted information; and performing an electromagnetic field analysis process of performing electromagnetic field analysis on the created model, wherein the model creation information extraction process includes: obtaining evaluation frequency information that includes an evaluation frequency for an apparatus suffering noise; obtaining noise frequency information that includes a noise frequency for a component acting as a noise source; obtaining target material information of a determination target; determining whether or not a conductive component is present in the obtained target material information; determining the conductive component as having an antenna operating portion that operates as an antenna if the conductive component is present in the obtained target material information; determining whether or not a division or multiplication of the noise frequency obtained by dividing or multiplying the noise frequency by any integer corresponds to the evaluation frequency; and determining the noise source as a noise source for creation of the model if the division or multiplication of the noise frequency corresponds to the evaluation frequency, wherein the model automatic creation process includes: determining whether or not a component to be determined is the conductive component determined as having the antenna operating portion; and creating the model to have a simplified shape except for the component to be determined if the component to be determined is the component determined as having the antenna operating portion, and wherein the electromagnetic field analysis process includes: performing electromagnetic field analysis on the created model.

The present disclosures provides a non-transitory computer readable medium storing a program causing a processor in an electromagnetic field simulator connectable to an input device and a display device to execute; a model creation information extraction process of extracting information for creation of a model; a model automatic creation process of creating the model based on the extracted information; and an electromagnetic field analysis process of performing electromagnetic field analysis on the created model, wherein the model creation information extraction process includes: obtaining evaluation frequency information that includes an evaluation frequency for an apparatus suffering noise; obtaining noise frequency information that includes a noise frequency for a component acting as a noise source; obtaining target material information of a determination target; determining whether or not a conductive component is present in the obtained target material information; determining the conductive component as having an antenna operating portion that operates as an antenna if the conductive component is present in the obtained target material information; determining whether or not a division or multiplication of the noise frequency obtained by dividing or multiplying the noise frequency by any integer corresponds to the evaluation frequency; and determining the noise source as a noise source for creation of the model if the division or multiplication of the noise frequency corresponds to the evaluation frequency, wherein the model automatic creation process includes: determining whether or not a component to be determined is the conductive component determined as having the antenna operating portion; and creating the model to have a simplified shape except for the component to be determined if the component to be determined is the component determined as having the antenna operating portion, and wherein the electromagnetic field analysis process includes: performing electromagnetic field analysis on the created model.

According to the present disclosure, an analysis model analyzable even by a general-purpose PC can be created easily.

DETAILED DESCRIPTION

Figure 1:
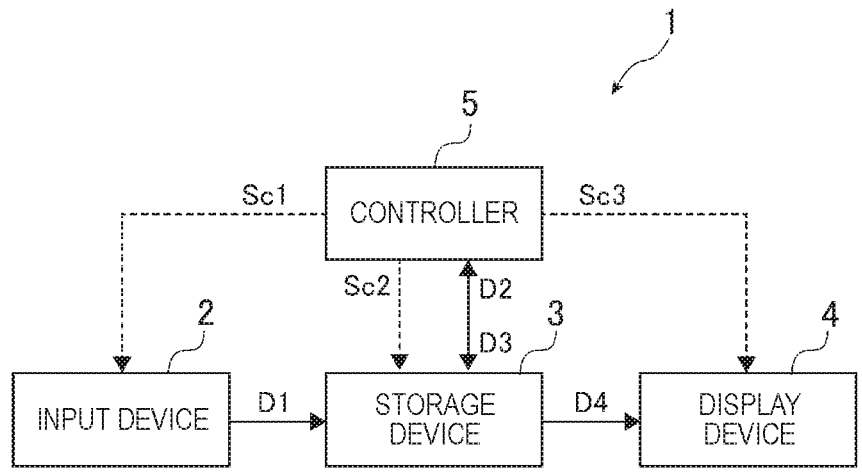
FIG. 1 is a block diagram showing the configuration of an electromagnetic field simulator according to a first embodiment.

While referring to the drawings suitably, embodiments in each of which an electromagnetic field simulator according to the present disclosure is specifically disclosed (hereinafter referred to as "present embodiments") will be described below in detail. However, excessive detailed description may be omitted. For example, detailed description about matters that have been known well already or duplicate description about substantially the same configuration may be omitted. This is to avoid the following description from being unnecessarily redundant so as to make the following description easy to be understood by those skilled in the art. Incidentally, the accompanying drawings and the following description are provided in order to make those skilled in the art understand the present disclosure sufficiently. They are not intended to limit the subject stated in the scope of Claims.

The present embodiments suitable for carrying out the present disclosure will be described below in detail with reference to the drawings.

First Embodiment

An electromagnetic field simulator 1 according to a first embodiment will be described below with reference to FIG. 1. FIG. 1 is a block diagram showing the configuration of the electromagnetic field simulator 1 according to the first embodiment. In FIG. 1, the electromagnetic field simulator 1 includes an input device 2, a storage device 3, a display device 4 and a controller 5. Data are input from the outside through the input device 2. The storage device 3 stores the data input through the input device 2. The display device 4 displays the data stored in the storage device 3. The controller 5 controls the input device 2, the storage device 3 and the display device 4 individually. The controller 5 performs an arithmetic operation on the data stored in the storage device 3 and controls the storage device 3 to store a result of the arithmetic operation. The controller 5 includes a processor and a memory storing a computer program. The computer program may be stored in a non-transitory computer readable medium, such as the storage device 3 or other storage device.

The input device 2 is, for example, a keyboard or a mouse. The storage device 3 is, for example, a mass storage device such as a hard disk or an SSD (Solid State Drive). The display device 4 is, for example, a liquid crystal display or an organic EL display. The controller 5 is, for example, a CPU (Central Processing Unit) that cooperates with at least part of the input device 2, the storage device 3 and the display device 4 to perform a model creation information extraction process of extracting necessary information for creation of a model, a model automatic creation process of creating the model based on the extracted information, and an electromagnetic field analysis process of performing electromagnetic field analysis on the created model. From the controller 5, a control signal Sc1 is output to the input device 2, a control signal Sc2 is output to the storage device 3, and a control signal Sc3 is output to the display device 4. In addition, data D2 and data D3 are exchanged between the controller 5 and the controller 3. In addition, data D1 is output from the input device 2 to the storage device 3. Data D4 stored in the storage device 3 is output to the display device 4.

In the model creation information extraction process performed by the controller 5, frequency information of an apparatus suffering noise is input as sufferer information, and frequency information of a component acting as a noise source is input as assailant information. Here, the frequency for the apparatus suffering the noise is called "evaluation frequency", and the frequency for the component acting as the noise source is called "noise frequency". The evaluation frequency information may include, for example, an evaluation frequency for a wireless apparatus to be mounted on the determination target, an evaluation frequency for wireless apparatus to be disposed in the vicinity of the determination target, an evaluation frequency defined in a legal regulation, and an evaluation frequency defined in a standard of an industry group, and the noise frequency information may include, for example, an operating frequency of a crystal, an operating frequency of an IC, and a wireless/wired communication frequency. Target material information of the determination target includes, for example, physical object information, a photograph or mechanism CAD (three-dimensional computer-aided design information). Incidentally, the mechanism CAD means design data using CAD for a housing, various components, etc. constituting an electronic apparatus.

In the model creation information extraction process, the controller 5 obtains the target material information of the determination target, and then determines whether a conductive component containing metal is present in the target material information or not. When the conductive component is present, the controller 5 determines the component as having an antenna operating portion operating as an antenna. In addition, in the model creation information extraction process, the controller 5 determines whether a division or multiplication of the noise frequency corresponds to the evaluation frequency or not. When the division or multiplication of the noise frequency corresponds to the evaluation frequency, the controller 5 determines that the noise source is a necessary noise source for creation of a model. The division of the noise frequency is obtained, for example, by dividing the noise frequency by any integer. Further, the multiplication of the noise frequency is obtained, for example, multiplying the noise frequency by any integer.

In the model automatic creation process performed by the controller 5, determination is made as to whether a component to be determined is the component determined as having the antenna operating portion in the model creation information extraction process or not, and when it is the component determined as having the antenna operating portion, a model is created to have a simplified shape except for the component to be determined. In the electromagnetic field analysis process performed by the controller 5, electromagnetic field analysis is performed on the model created in the model automatic creation process.

Next, operation of the electromagnetic field simulator 1 according to the first embodiment will be described.

Figure 2:
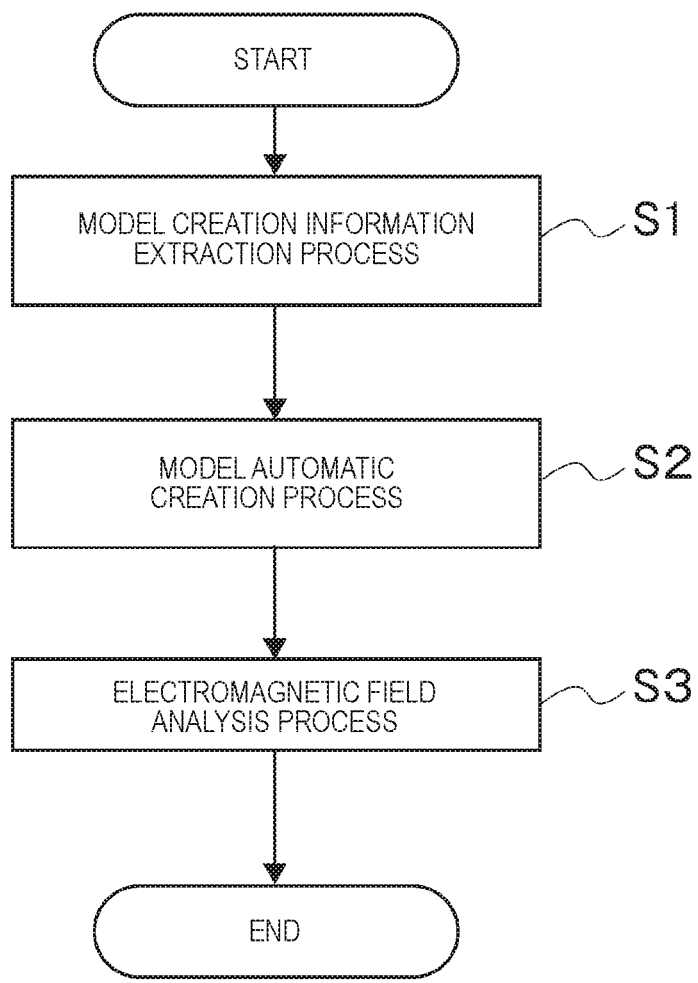
FIG. 2 is a flow chart showing main operation steps of the electromagnetic field simulator according to the first embodiment.

FIG. 2 is a flow chart showing main operation steps of the electromagnetic field simulator 1 according to the first embodiment. In FIG. 2, the controller 5 sequentially performs a model creation information extraction process S1, a model automatic creation process S2 and an electromagnetic field analysis process S3 in the above-described manner. These processes will be described below in detail.

Figure 3:
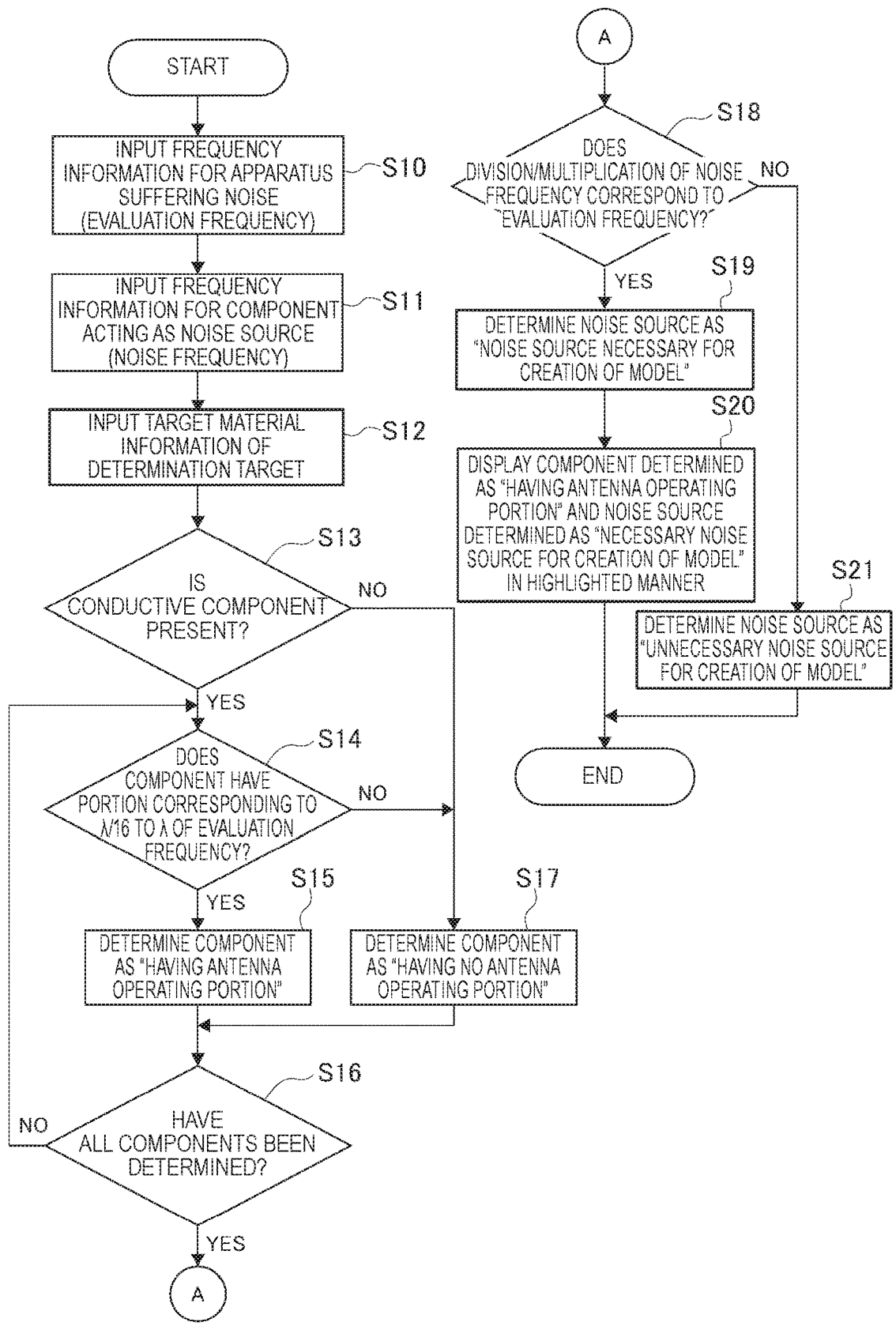
FIG. 3 is a flow chart showing operation steps of a model creation information extraction process of the electromagnetic field simulator according to the first embodiment.

FIG. 3 is a flow chart showing operation steps of the model creation information extraction process S1 of the electromagnetic field simulator 1 according to the first embodiment. In FIG. 3, the controller 5 controls the input device 2 to input evaluation frequency information of an apparatus suffering noise, noise frequency information of a component acting as a noise source, and target material information of the determination target respectively (steps S10 to S12). As described above, the evaluation frequency information is information including a mounted wireless apparatus, an adjacent wireless apparatus, a legal regulation, a standard of an industrial group, etc., and the noise frequency information is information including an operating frequency of a crystal, an operating frequency of an IC, a wireless/wired communication frequency, etc. In addition, the target material information of the determination target is physical object information, a photograph, mechanism CAD, etc.

Figure 4:
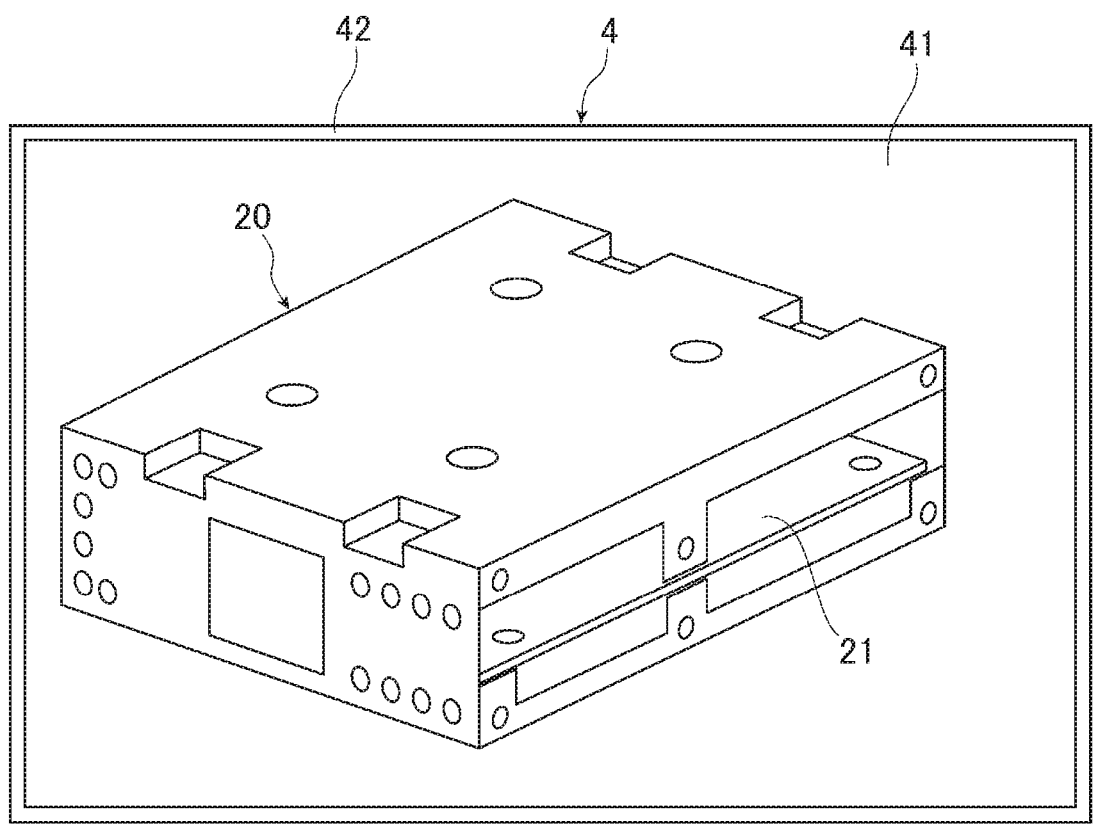
FIG. 4 is a view showing an example of an input screen of target material information of a determination target in the electromagnetic field simulator according to the first embodiment.

The controller 5 controls the storage device 3 to store the evaluation frequency information, the noise frequency information and the target material information of the determination target, that have been input by the input device 2. The evaluation frequency information, the noise frequency information and the target material information of the determination target, that have been stored in the storage device 3, are converted into a data format displayable on the display device 4, and displayed on the display device 4. FIG. 4 is a view showing an example of an input screen 41 of the target material information of the determination target. On the input screen 41 shown in FIG. 4, for example, an on-vehicle unit 20 of a car navigation system imaged by an imaging apparatus such as a camera is displayed as the target material information of the determination target. Incidentally, a double frame 42 shown in FIG. 4 represents a monitor frame of the display device 4. The on-vehicle unit 20 is made of metal and formed into a rectangular parallelepiped shape. A printed board 21 is received in the on-vehicle unit 20.

After the evaluation frequency information, the noise frequency information and the target material information of the determination target are input and stored, the controller 5 determines whether a conductive component is present in the target material information of the determination target (e.g. the on-vehicle unit 20) or not (step S13). When determination is made that the conductive component is present in the on-vehicle unit 20 ("YES" in the step S13), the controller 5 determines whether the component has a portion corresponding to $\lambda/16$ to $\lambda$ of the evaluation frequency or not (step S14). When determination is made that the component has the portion corresponding to the λ/16 to λ of the evaluation frequency ("YES" in the step S14), the controller 5 determines the component as "having an antenna operating portion" (step S15). When the component does not have any portion corresponding to the λ/16 to 1, of the evaluation frequency ("NO" in the step S14), the controller 5 determines the component as having no antenna operating portion (step S17). As used herein, the λ is a wavelength of an electromagnetic wave corresponding to the evaluation frequency.

When determination in the step S13 is made that the conductive component is absent from the target material information of the determination target (the determination in the step S13 concludes "NO"), the controller 5 does not make determination in the step S14 but skips to the step S17 to determine the conductive component as "having no antenna operating portion".

After the conductive component is determined as "having the antenna operating portion" in the step S15 or determined as "having no antenna operating portion" in the step S17, the controller 5 determines whether all conductive components have been determined or not (step S16). That is, when the target material information of the determination target like the on-vehicle unit 20 is constituted by a plurality of conductive components, the controller 5 determines whether each of the conductive components corresponds to the λ/16 to λ of the evaluation frequency or not. When determination is made that there is still an undetermined component ("NO" in the step S16), the controller 5 returns to the step S14. On the other hand, when determination is made that all of the conductive components have been determined ("YES" in the step S16), the controller 5 determines whether the division or multiplication of the noise frequency corresponds to the evaluation frequency or not (step S18). When determination is made that the division or multiplication of the noise frequency corresponds to the evaluation frequency ("YES" in the step S18), the controller 5 determines a noise source as a "necessary noise source for creation of a model" (step S19). The component determined as "having the antenna operating portion" and the noise source determined as the "necessary noise source for creation of the model" are displayed in a highlighted manner (step S20). Then, the controller 5 ends the present process. On the other hand, when determination in the step S18 is made that the division or multiplication of the noise frequency does not correspond to the evaluation frequency (the determination concludes "NO"), the controller 5 does not perform processings of the steps S19 and S20 but determines a noise source as an "unnecessary noise source for creation of the model" (step S21). Then, the controller 5 ends the present process.

Figure 5:
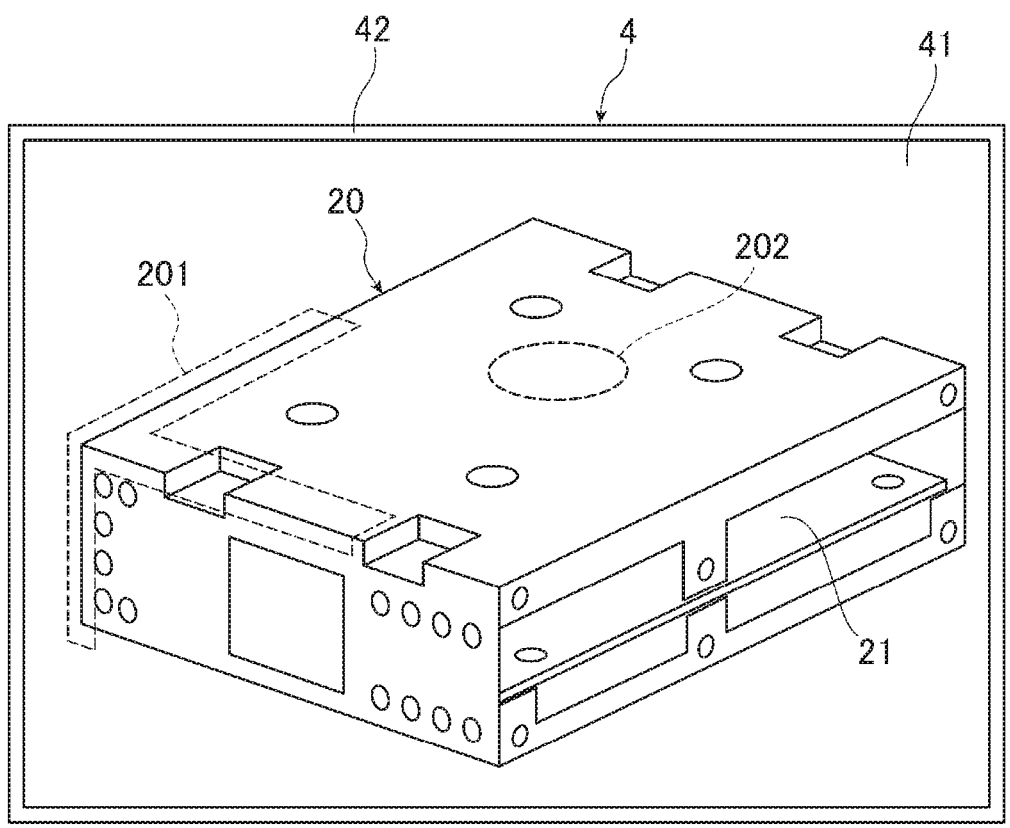
FIG. 5 is a view showing an example of highlight display of a component determined as "having an antenna operating portion" and a noise source determined as "a necessary noise source for creation of a model" in an on-vehicle unit which is the target material of the determination target shown in FIG. 4.

FIG. 5 is a view showing an example of highlight display of a component determined as "having an antenna operating portion" and a noise source determined as a "necessary noise source for creation of a model" in the on-vehicle unit 20 that is the target material information of the determination target shown in FIG. 4. The example shown in FIG. 5 is the highlight display in a case where the evaluation frequency f is equal to 100 MHz. A component 201 is the component determined as "having the antenna operating portion", and a noise source 202 is the "necessary noise source for creation of the model". The component 201 determined as "having the antenna operating portion" is mounted at a corner portion of the on-vehicle unit 20 and substantially forms a T-shape. The noise source 202 determined as the "necessary noise source for creation of the model" is substantially mounted at a central portion of the on-vehicle unit 20. In order to indicate the highlight display of both the component 201 and the noise source 202, they are drawn by a chain line.

Figure 6:
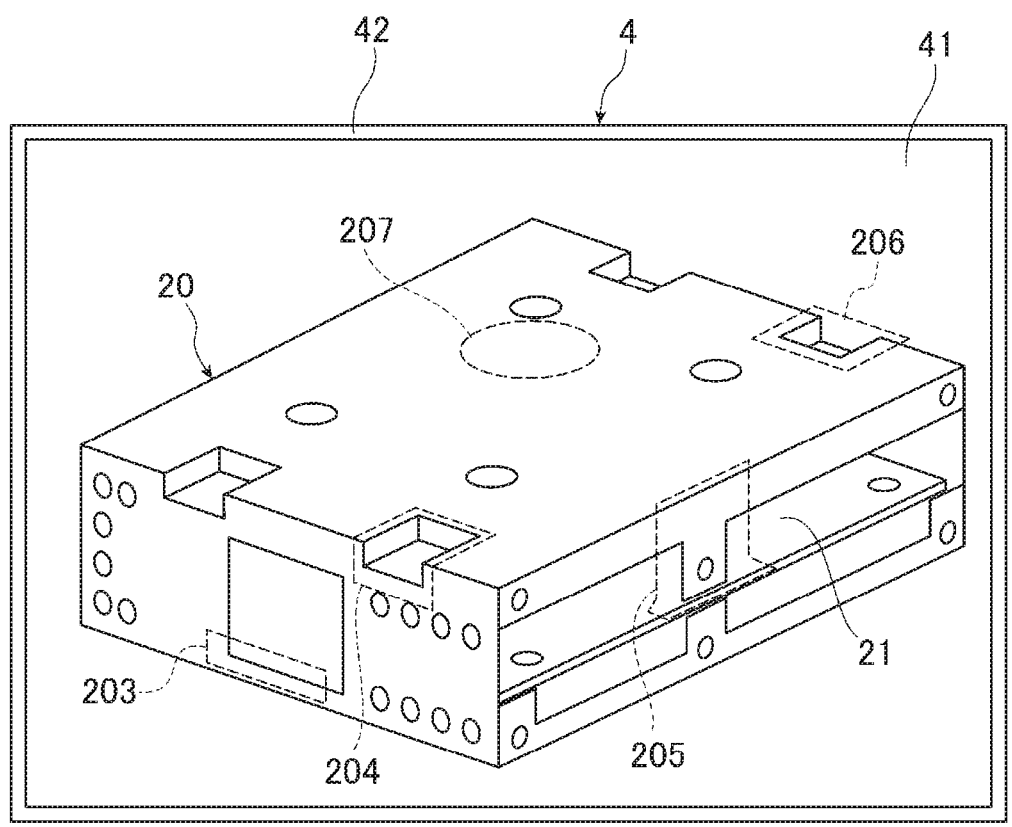
FIG. 6 is a view showing an example of highlight display when an evaluation frequency f is equal to 1 GHz in the on-vehicle unit that is the target material of the determination target shown in FIG. 4.

FIG. 6 is a view showing an example of highlight display of the on-vehicle unit 20 that is the target material information of the determination target shown in FIG. 4 in a case where the evaluation frequency f is equal to 1 GHz. In the case where the evaluation frequency f is equal to 1 GHz, each of components 203 to 206 is a component determined as "having an antenna operating portion", and a noise source 207 is a noise source determined as a "necessary noise source for creation of a model". Each of the components 203 to 206 determined as "having the antenna operating portion" is a recessed portion or a narrow plate-like portion of a body of the on-vehicle unit 20. Incidentally, it can be said that they should be regarded as portions of the on-vehicle unit 20 rather than as components. This is however merely an example.

The noise source 207 determined as the "necessary noise source for creation of the model" is mounted at a position slightly different from the position of the noise source 202 in FIG. 5. In order to indicate the highlight display of the components 203 to 206 and the noise source 207, they are all drawn by a chain line. Thus, the conductive components and the noise source corresponding to the evaluation frequency are displayed in the highlighted manner.

Figure 7:
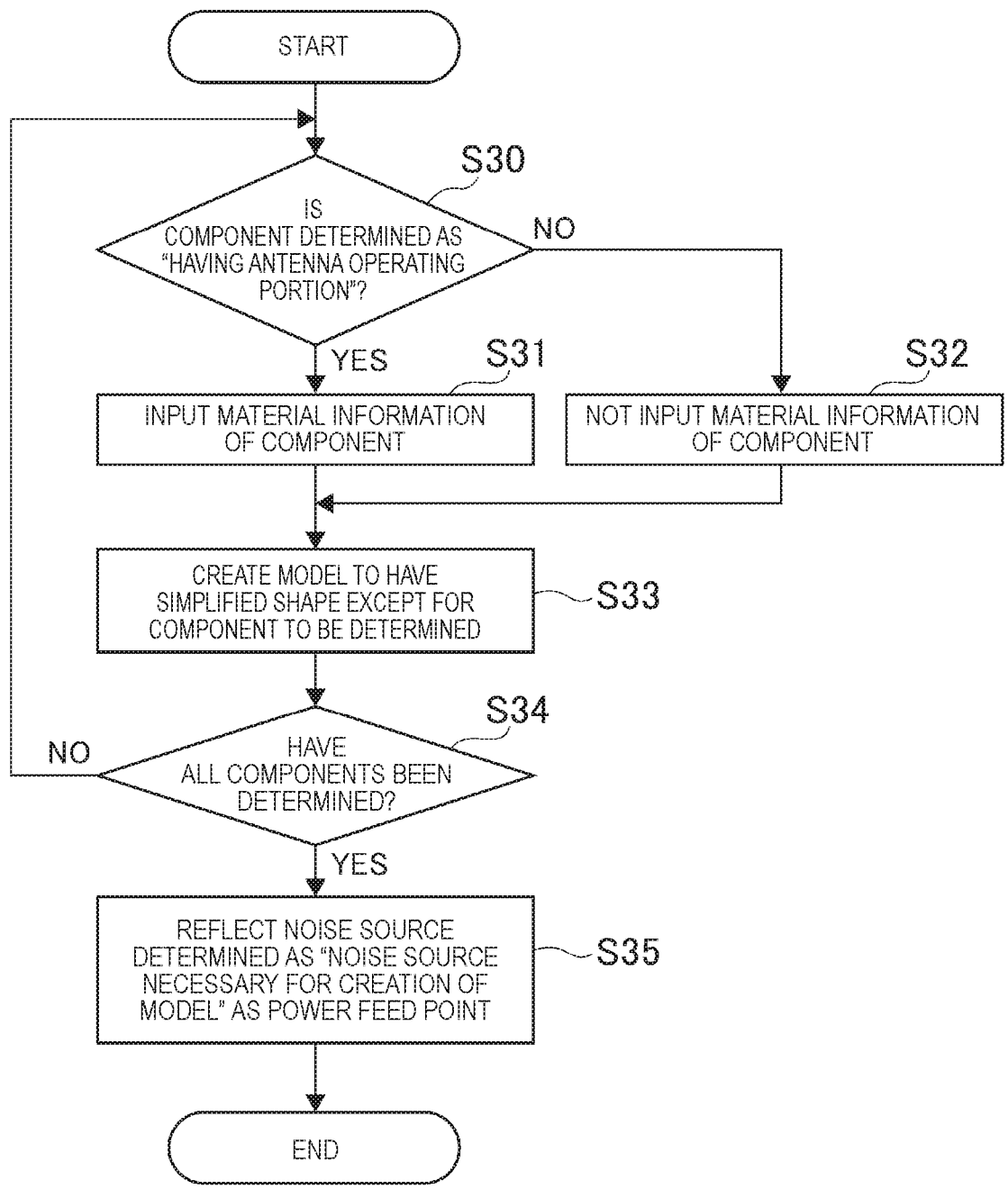
FIG. 7 is a flow chart showing operation steps of a model automatic creation process of the electromagnetic field simulator according to the first embodiment.

FIG. 7 is a flow chart showing operation steps of the model automatic creation process S2 of the electromagnetic field simulator 1 according to the first embodiment. In FIG. 7, the controller 5 first determines whether a conductive component is the component determined as "having the antenna operating portion" or not (step S30). When the conductive component is determined as the component ("Yes" in the step S30), the controller 5 controls the input device 2 to input material information of the component (step S31). On the other hand, when determination is made that the conductive component is not the component determined as "having the antenna operating portion" ("NO" in the step S30), the controller 5 does not input material information of the component (step S32). After processing of the step S31 or the step S32 is performed, the controller 5 creates a model to have a simplified shape except for the component to be determined (step S33). For example, the controller 5 creates a model in which an irregularity or a hole is filled with metal. After the model is created, the controller 5 determines whether all components have been determined or not (step S34). When determination is made that all the components have not been determined ("NO" in the step S34), the controller 5 returns to the step S30. When determination is made that all the components have been determined ("YES" in the step S34), the controller 5 reflects a noise source determined as the "necessary noise source for creation of the model", as a power feed point (step S35). Then, the controller 5 ends the present process.

Figure 8:
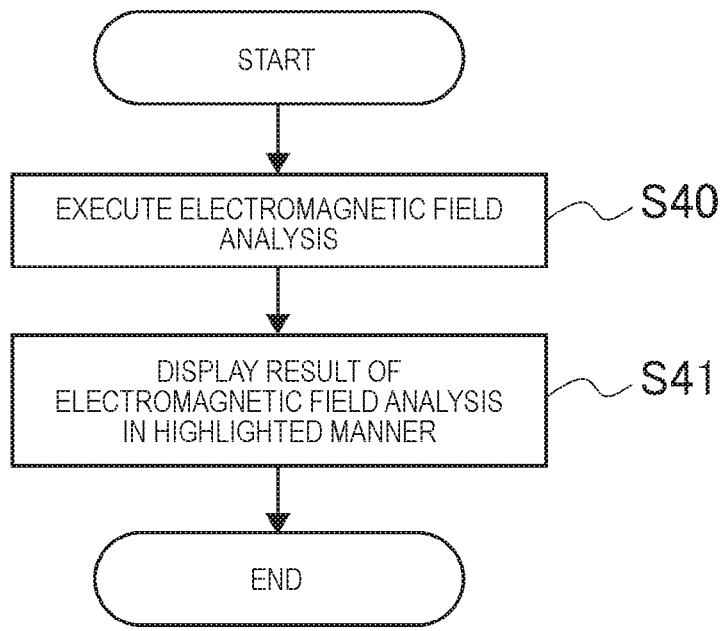
FIG. 8 is a flow chart showing operation steps of an electromagnetic field analysis process of the electromagnetic field simulator according to the first embodiment.

FIG. 8 is a flow chart showing operation steps of the electromagnetic field analysis process S3 of the electromagnetic field simulator 1 according to the first embodiment. In FIG. 8, the controller 5 first uses the created model and executes electromagnetic field analysis thereon (step S40). Next, the controller 5 displays, in a highlighted manner, a result obtained by the electromagnetic field analysis (step S41). Then, the controller 5 ends the present process.

Figure 9:
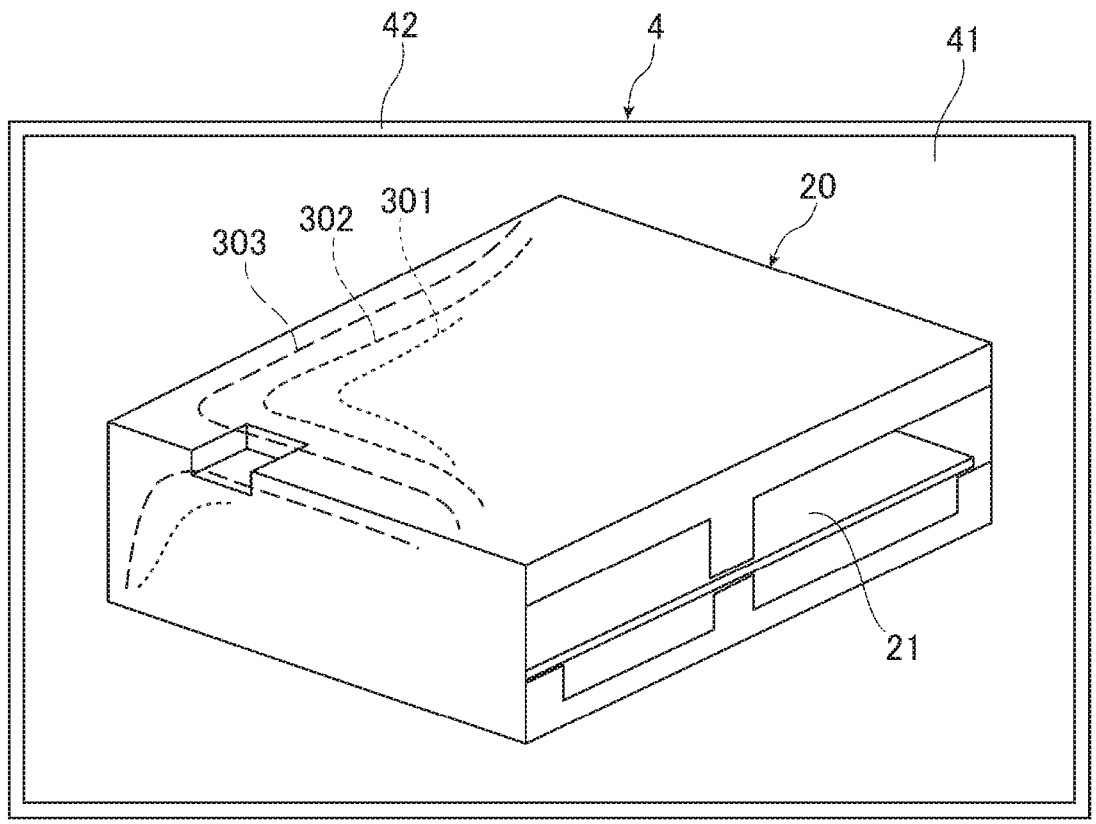
FIG. 9 is a view showing an example of highlight display of an electromagnetic field analysis result made by the electromagnetic field simulator according to the first embodiment.

FIG. 9 is a view showing an example of highlight display of an electromagnetic field analysis result. In the example shown in FIG. 9, magnetic field intensities in a case where the evaluation frequency f is equal to 100 MHz are displayed in a highlighted manner. The magnetic field intensities 0.8 (A/m), 0.5 (A/m) and 0.3 (A/m) are indicated by three chain lines 301 to 303. That is, the chain line 301 indicates the magnetic field intensity 0.3 (A/m), the chain line 302 indicates the magnetic field intensity 0.5 (A/m), and the chain line 303 indicates the magnetic field intensity 0.8 (A/m). Incidentally, the chain lines 301 to 303 indicating the magnetic field intensities may be varied in color according to the magnetic field intensities or numerical values of the magnetic field intensities may be also indicated. When the colors of the chain lines 301 to 303 are varied, for example, the chain line 301 corresponding to 0.3 (A/m) may be indicated by a yellow color, the chain line 302 corresponding to 0.5 (A/m) may be indicated by an orange color, and the chain line 303 corresponding to 0.8 (A/m) may be indicated by a red color.

Thus, the electromagnetic field simulator 1 according to the first embodiment inputs evaluation frequency information that is frequency information of an apparatus suffering noise, noise frequency information that is frequency information of a component acting as a noise source, and a target material information of the determination target, and determines whether a conductive component is present in the target material information of the determination target or not. When the conductive component is present, the electromagnetic field simulator 1 according to the first embodiment determines that the conductive component has a portion corresponding to $\lambda 16$ to $\lambda$ of the evaluation frequency. Then, the electromagnetic field simulator 1 according to the first embodiment displays the portion as a component determined as "having an antenna operating portion" in a highlighted manner. In addition, the electromagnetic field simulator 1 according to the first embodiment determines whether the division or multiplication of the noise frequency corresponds to the evaluation frequency or not. When the division or multiplication of the noise frequency corresponds to the evaluation frequency, the electromagnetic field simulator 1 according to the first embodiment determines the division or multiplication of the noise frequency, as a necessary noise source for creation of a model, and displays the division or multiplication of the noise frequency in a highlighted manner. Further, the electromagnetic field simulator 1 according to the first embodiment creates the model to have a simplified shape except for the component to be determined determined as having the antenna operating portion, reflects the necessary noise source for creation of the model as a power feed point on the created model, performs electromagnetic field analysis on the thus obtained model, and displays an electromagnetic field analysis result in a highlighted manner.

As described above, the electromagnetic field simulator 1 according to the first embodiment creates the model from only the metal operating as the antenna. Accordingly, a calculation amount can be reduced so that analysis can be made easily even by a general-purpose PC. In addition, the component operating as the antenna operating portion and the noise source determined as the necessary noise source for creation of the model are displayed in the highlighted manner, and the result obtained by performing the electromagnetic field analysis on the created model is displayed in the highlighted manner. Accordingly, an appropriate mounting position of the component can be determined in design of the electronic apparatus. Further, design conditions can be examined prior to trial manufacturing. Accordingly, design change after the trial manufacturing can be eliminated so that occurrence of wasteful expenses can be suppressed, and a design period can be shortened.

Incidentally, although the target portions are displayed in the highlighted manner on the screen in the electromagnetic field simulator 1 according to the first embodiment, only the target portions may be displayed alternatively.

Although the model is created from only the metal operating as the antenna in the electromagnetic field simulator 1 according to the first embodiment, the model may be also manually corrected as occasion demands, and the other portions than the target portions may be modeled by a planar metal plate.

In addition, the function provided by the electromagnetic field simulator 1 according to the first embodiment may be given to a cloud so that service can be provided on the cloud.

Second Embodiment

Figure 10:
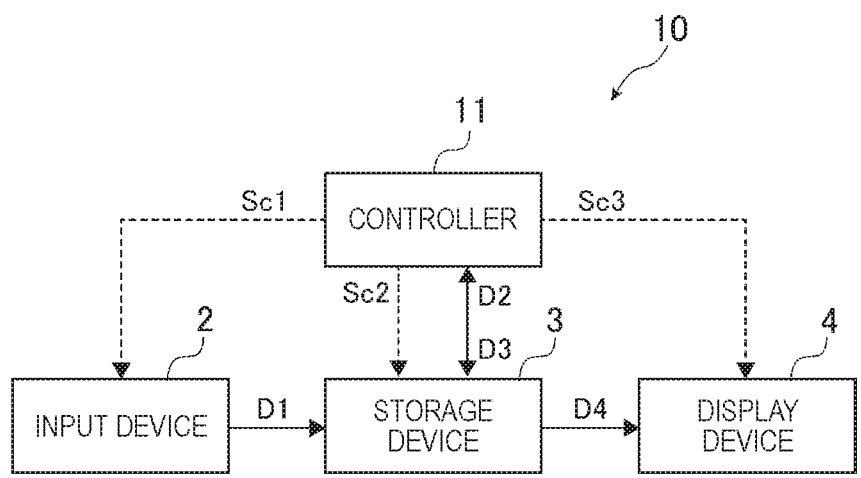
FIG. 10 is a block diagram showing the configuration of an electromagnetic field simulator according to a second embodiment.

FIG. 10 is a block diagram showing the configuration of an electromagnetic field simulator 10 according to a second embodiment. Incidentally, portions common with the FIG. 1 are referred to by the same signs correspondingly and respectively in FIG. 10. In FIG. 10, the electromagnetic field simulator 10 according to the second embodiment builds a model for an electronic apparatus constituted by a housing, a printed board, a heating component etc., out of metal components selected from the constituent components of the electronic apparatus, and performs simulation on the model at a designated frequency. The electromagnetic field simulator 10 according to the second embodiment includes an input device 2, a storage device 3, a display device 4, and a controller 11. Data are input from the outside through the input device 2. The storage device 3 stores the data input through the input device 2. The display device 4 displays the data stored in the storage device 3. The controller 11 controls the input device 2, the storage device 3 and the display device 4 individually. At the same time, the controller 11 performs an arithmetic operation on the data stored in the storage device 3 and controls the storage device 3 to store a result of the arithmetic operation.

Incidentally, control signals output from the controller 11 to the input device 2, the storage device 3 and the display device 4 individually, exchange of data between the controller 11 and the storage device 3, output of data from the input device 2 to the storage device 3, and output of data from the storage device 3 to the display device 4 are similar to or the same as those in the electromagnetic field simulator 1 according to the first embodiment.

Figure 11A:
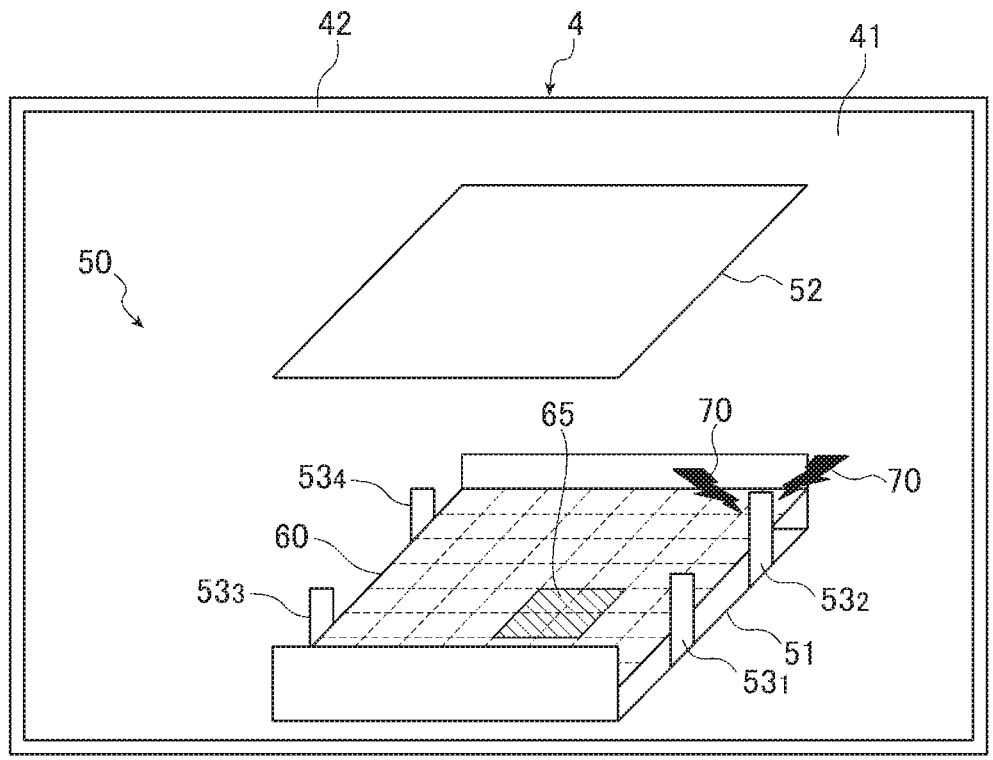
FIGS. 11A and 11B are views each showing an input screen of an electronic apparatus that is an input subject of mechanism data in the electromagnetic field simulator according to the second embodiment.
Figure 11B:
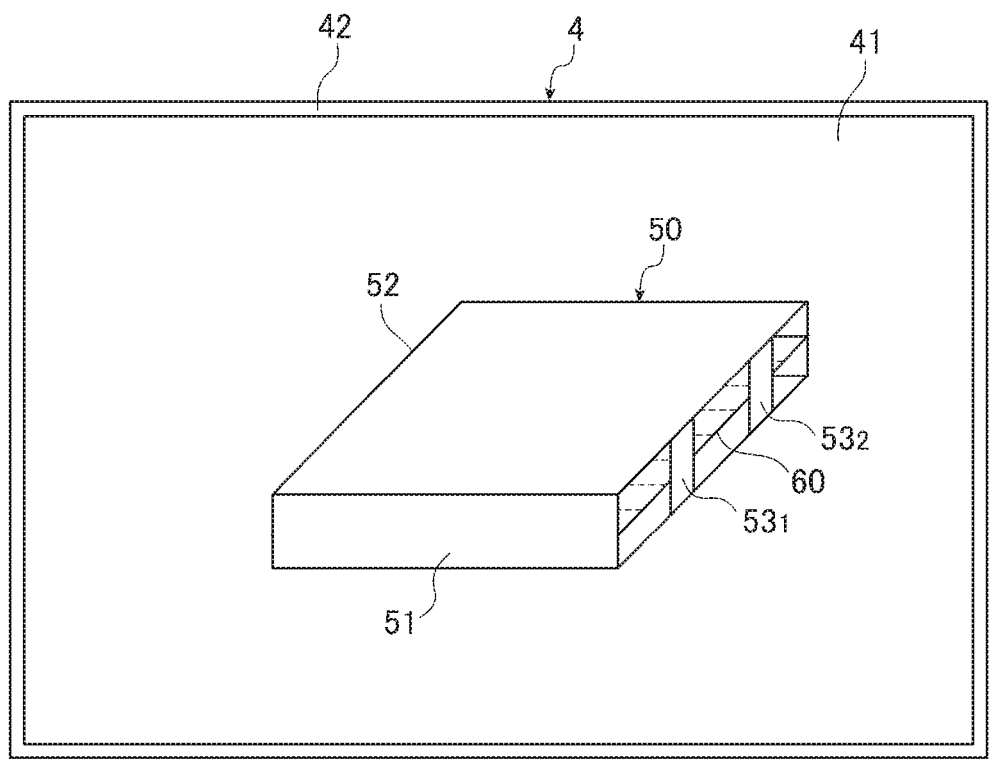

The electronic apparatus is, for example, an on-vehicle unit of a car navigation system. FIGS. 11A and 11B are views showing an input screen 41 of an electronic apparatus 50. FIG. 11A shows an input screen when an upper housing (lid portion) 52 has been removed from a lower housing 51. FIG. 11B shows an input screen when the upper housing 52 has been attached to the lower housing 51. As shown in FIGS. 11A and 11B, the lower housing 51 of the electronic apparatus 50 forms a shape in which a front portion and a rear portion are bent at a right angle respectively and opposite left and right sides are opened. Two plate-like pieces 53 are provided on each of the left and right sides. The two plate-like pieces 53 on each of the opposite left and right sides are disposed separately from each other. Here, of the plate-like pieces 53 on the right side when facing FIGS. 11A and 11B, a front one and a rear one are denoted as $53_1$ and $53_2$ respectively, and, of the plate-like pieces 53 on the left side when facing FIGS. 11A and 11B, a front one and a rear one are denoted as $53_3$ and $53_4$ respectively. The plate-like pieces $53_1$ to $53_4$ of the lower housing 51 are provided for fixing the upper housing 52 to the lower housing 51. A printed board 60 is received in the lower housing 51.

Return to FIG. 10. The controller 11 is, for example, a CPU, that cooperates with at least part of the input device 2, the storage device 3 and the display device 4 to input mechanism data of constituent elements (including the printed board 60) constituting the electronic apparatus 50, input material information indicating materials of the constituent elements corresponding to the input mechanism data, extract metal objects from the mechanism data based on the input material information, and create a model for simulation. The mechanism data are respective shapes, dimensions and coordinate data of the upper and lower housings 51 and 52, a component (not shown) and the printed board 60 constituting the electronic apparatus 50, which are input through the input device 2. In addition, the material information is material information of the upper and lower housings 51 and 52, the component (not shown) and the printed board 60 of the mechanism data, which are input through the input device 2.

The controller 11 obtains a mounting unsuitable area 65 (FIG. 11A) in which mounting of a component acting as a noise source is regarded as unsuitable on the printed board 60 constituting the electronic apparatus 50 based on the created model, and displays the mounting unsuitable area 65 in a highlighted manner. That is, the controller 11 performs the following processes (processes (1)-(6)) to obtain the mounting unsuitable area 65 and display the mounting unsuitable area 65 in a highlighted manner. Incidentally, the other areas than the unsuitable area represent suitable areas.

(1) Set a division number for dividing the printed board 60 constituting the electronic apparatus 50, based on the created model. The division number is, for example, 8/16/32/64. A mounting position (a mounting position of a component such as an IC or an oscillator) can be calculated with accuracy that is higher as the division number is larger.

(2) Set a noise frequency acting as a noise source from frequencies that are used or generated inside the electronic apparatus 50.

(3) Set an evaluation frequency at which an EMI level should be checked.

(4) Set the EMI level that should be checked at the evaluation frequency set in (3).

(5) Divide the printed board 60 by the division number set in (1), and perform an arithmetic operation to thereby determine whether the evaluation frequency set in (3) exceeds the EMI level set in (4) or not in each of the divided areas when there is the noise frequency set in (2).

(6) When there is a divided area where the evaluation frequency set in (3) exceeds the EMI level set in (4) as a result of the arithmetic operation in (5), the divided area is displayed in a highlighted manner as a mounting unsuitable area 65 where mounting of a component (an IC, an oscillator, or the like) acting as a noise source is regarded as unsuitable. Incidentally, the other areas than the unsuitable area represent suitable areas.

Assume that a portion where the evaluation frequency exceeds the EMI level is, for example, the plate-like piece $53_2$ of the lower housing 51 shown in FIG. 11A. In this case, as highlight display, thunder marks 70 are displayed in the vicinity of the plate-like piece $53_2$. Incidentally, on this occasion, the display of the thunder marks 70 may be blinked on and off. In addition, when the portion where the evaluation frequency exceeds the set EMI level is displayed in a highlighted manner, the portion may be displayed by a color varying according to a value of the EMI level or the value of the EMI level may be displayed. When, for example, the EMI level is 10 to 20 (dBμV/m), the portion is displayed by a yellow color. When the EMI level is 20 to 30 (dBμV/m), the portion is displayed by an orange color. When the EMI level is 30 to 40 (dBμV/m), the portion is displayed by a red color. Thus, when the component such as the IC or the oscillator acting as the noise source is mounted on the mounting unsuitable area 65, the portion where the evaluation frequency exceeds the set EMI level, i.e. the plate-like piece $53_2$ of the lower housing 51, is displayed in a highlighted manner.

Next, operation of the electromagnetic field simulator 10 according to the second embodiment will be described.

Figure 12:
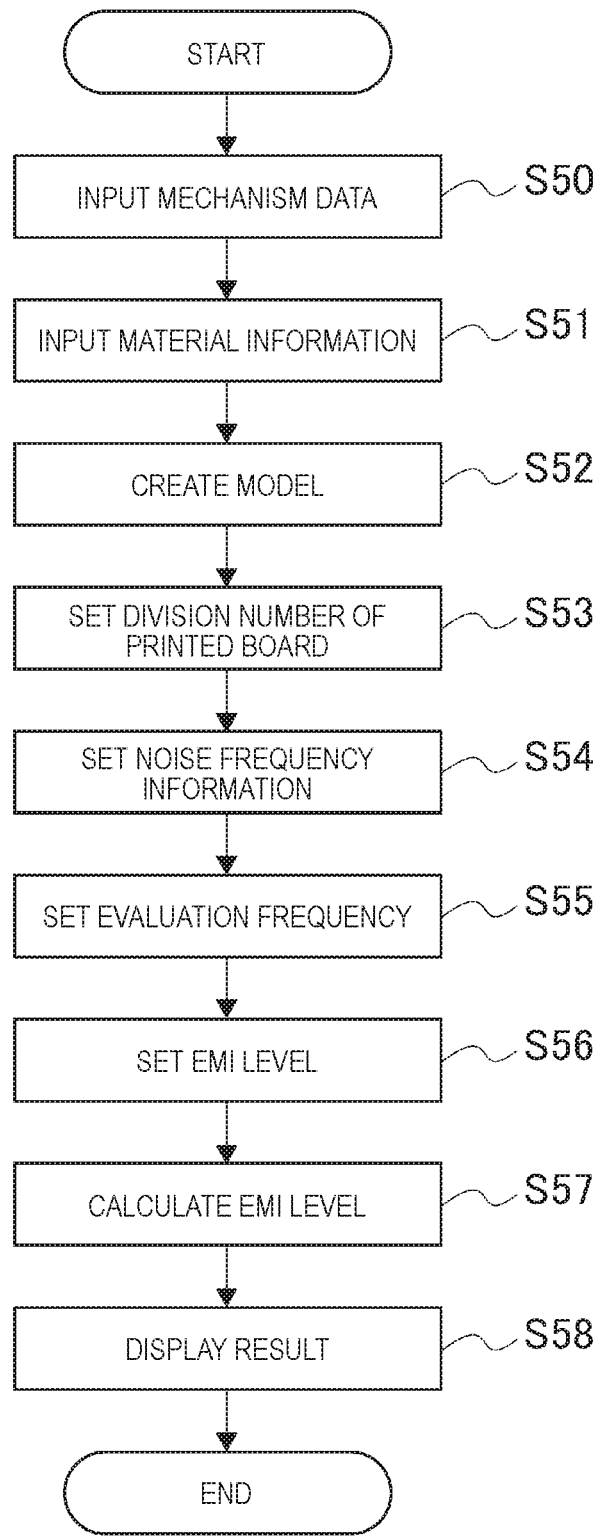
FIG. 12 is a flow chart showing operation steps of the electromagnetic field simulator according to the second embodiment.

FIG. 12 is a flow chart showing operation steps of the electromagnetic field simulator 10 according to the second embodiment. In FIG. 12, the controller 11 first inputs mechanism data including respective shapes, dimensions and coordinates of upper and lower housings 51 and 52, a component (not shown) and a printed board 60 constituting an electronic apparatus 50 (step S50). Next, the controller 11 inputs material information of the housings 51 and 52, the component (not shown) and the printed board 60 of the mechanism data (step S51).

After the mechanism data and the material information are input, the controller 11 uses the mechanism data and the material information to create a model (step S52). That is, the controller 11 extracts each metal substance from the input mechanism data based on the input material information, deletes each non-metal substance from the mechanism data, and creates a model for simulation.

After the model for simulation is created, the controller 11 sets a division number of the printed board 60 (step S53). That is, the controller 11 sets the division number in consideration of the size of the printed board 60 disposed inside the electronic apparatus 50 or a component (an IC, an oscillator, etc. acting as a noise source) mounted on the printed board 60. For example, the division number is set at 8/16/32/64.

After the division number of the printed board 60 is set, the controller 11 sets noise frequency information (step S54). That is, the controller 11 sets a frequency acting as the noise source from frequencies that are used or generated inside the electronic apparatus 50. Further, the controller 11 calculates divided frequencies and multiplied frequencies of the set noise frequency, and incorporates the divided frequencies and the multiplied frequencies as noise frequencies into the noise frequency information.

After the noise frequency information is set, the controller 11 sets an evaluation frequency at which an EMI level is checked (step S55).

The controller 11 sets the EMI level at which the set evaluation frequency should be checked (step S56).

After the EMI level is set, the controller 11 calculates the EMI level (step S57). That is, the controller 11 divides the printed board 60 by the division number of the printed board set in the step S53, and makes calculation to determine whether the evaluation frequency set in the step S55 exceeds the EMI level set in the step S56 or not in each of the divided areas when there is the noise frequency set in the step S54.

The controller 11 displays a calculation result of the EMI level (step S58). That is, when there is a divided area where the evaluation frequency set in the step S55 exceeds the EMI level set in the step S56 as a result of the calculation made in the step S57, the controller 11 displays the divided area in a highlighted manner in order to let a user recognize that the IC, the oscillator, or the like, acting as the noise source should not be disposed in the divided area. In addition, the portion where the evaluation frequency exceeds the EMI level set in the step S56 at this time is displayed in the highlighted manner, and a value of the EMI level is displayed.

In the above-described manner, the electromagnetic field simulator 10 according to the second embodiment builds a model out of only metal components selected from structures constituting the electronic apparatus 50, divides the printed board 60 and makes calculation. Thus, a portion where noise exceeding the EMI level set in accordance with each evaluation frequency and a portion where the IC, the oscillator, or the like is disposed on the printed board 60 at that time are displayed as a mounting unsuitable area 65.

When the mounting unsuitable area 65 for the IC, the oscillator, or the like, on the printed board 60 is displayed in accordance with each noise frequency, a suitable mounting position of the IC, the oscillator, or the like can be determined. In addition, design conditions can be examined prior to trial manufacturing. Accordingly, design change after the trial manufacturing can be eliminated, so that occurrence of wasteful expenses can be suppressed, and a design period can be shortened.

In addition, when the model is built out of only the metal components selected from the structures constituting the electronic apparatus 50, a calculation amount can be reduced. Thus, calculation cost can be reduced.

Incidentally, the function provided by the electromagnetic field simulator 10 according to the second embodiment may be given to a cloud so that service can be provided on the cloud.

The present disclosure provides an electromagnetic field simulator connectable to an input device and a display device, the electromagnetic field simulator including a processor and a memory storing a computer program that, when executed by the processor, performs: a model creation information extraction process of extracting information for creation of a model; a model automatic creation process of creating the model based on the extracted information; and an electromagnetic field analysis process of performing electromagnetic field analysis on the created model, wherein the model creation information extraction process includes: obtaining evaluation frequency information that includes an evaluation frequency for an apparatus suffering noise; obtaining noise frequency information that includes a noise frequency for a component acting as a noise source; obtaining target material information of a determination target; determining whether or not a conductive component is present in the obtained target material information; determining the conductive component as having an antenna operating portion that operates as an antenna if the conductive component is present in the obtained target material information; determining whether or not a division or multiplication of the noise frequency obtained by dividing or multiplying the noise frequency by any integer corresponds to the evaluation frequency; and determining the noise source as a noise source for creation of the model if the division or multiplication of the noise frequency corresponds to the evaluation frequency, wherein the model automatic creation process includes: determining whether or not a component to be determined is the conductive component determined as having the antenna operating portion; and creating the model to have a simplified shape except for the component to be determined if the component to be determined is the component determined as having the antenna operating portion, and wherein the electromagnetic field analysis process includes: performing electromagnetic field analysis on the created model.

According to the present disclosure, the model can be simplified and created from only the metal operating as the antenna. Accordingly, a calculation amount can be reduced so that analysis can be made easily even by a general-purpose PC.

In the electromagnetic field simulator according to the present disclosure, the model creation information extraction process further includes: determining whether or not a portion corresponding to $\lambda/16$ to $\lambda$ of the evaluation frequency is present in the conductive component if the conductive component is present in the obtained target material information, the conductive component is determined as having the antenna operating portion if the portion corresponding to the $\lambda/16$ to $\lambda$ of the evaluation frequency is present in the conductive component, and the $\lambda$ is a wavelength of an electromagnetic wave corresponding to the evaluation frequency.

According to the present disclosure, the model can be simplified and created from only the metal operating as the antenna. Accordingly, a calculation amount can be reduced so that analysis can be made easily even by a general-purpose PC.

In the electromagnetic field simulator according to the present disclosure, the apparatus suffering the noise is one of a wireless apparatus to be mounted on the determination target, and a wireless apparatus to be disposed in a vicinity of the determination target.

According to the present disclosure, a model in which the apparatus suffering the noise has been reflected can be created.

In the electromagnetic field simulator according to the present disclosure, a frequency for the component acting as the noise source includes one of an operating frequency of a crystal, an operating frequency of an integrated circuit, and a wireless/wired communication frequency.

According to the present disclosure, a model in which the operating frequency of the crystal, the operating frequency of the integrated circuit, or the wireless/wired communication frequency is regarded as the noise source can be created.

In the electromagnetic field simulator according to the present disclosure, the target material information of the determination target includes one of physical object information, a photograph, and mechanism computer-aided design information.

According to the present disclosure, a model can be created from the physical object information, the photograph or the mechanism computer-aided design information used as the target material information to be determined.

In the electromagnetic field simulator according to the present disclosure, the model creation information extraction process further includes: displaying, in a highlighted manner, the conductive component determined as having the antenna operating portion and a noise source determined as the noise source for creation of the model.

According to the present disclosure, the conductive component operating as the antenna operating portion and the noise source determined as the noise source for creation of the model are displayed in the highlighted manner. Accordingly, an appropriate mounting position of the component can be determined in design of the electronic apparatus. Further, design conditions can be examined prior to trial manufacturing. Accordingly, design change after the trial manufacturing can be eliminated so that occurrence of wasteful expenses can be suppressed, and a design period can be shortened.

In the electromagnetic field simulator according to the present disclosure, the electromagnetic field analysis process further includes: displaying a result of the electromagnetic field analysis in a highlighted manner.

According to the present disclosure, a distribution of magnetic field intensity can be grasped precisely. Accordingly, design conditions can be examined prior to the trial manufacturing.

The present disclosure provides a method for operating an electromagnetic field simulator connectable to an input device and a display device, the method including: performing a model creation information extraction process of extracting information for creation of a model; performing a model automatic creation process of creating the model based on the extracted information; and performing an electromagnetic field analysis process of performing electromagnetic field analysis on the created model, wherein the model creation information extraction process includes: obtaining evaluation frequency information that includes an evaluation frequency for an apparatus suffering noise; obtaining noise frequency information that includes a noise frequency for a component acting as a noise source; obtaining target material information of a determination target; determining whether or not a conductive component is present in the obtained target material information; determining the conductive component as having an antenna operating portion that operates as an antenna if the conductive component is present in the obtained target material information; determining whether or not a division or multiplication of the noise frequency obtained by dividing or multiplying the noise frequency by any integer corresponds to the evaluation frequency; and determining the noise source as a noise source for creation of the model if the division or multiplication of the noise frequency corresponds to the evaluation frequency, wherein the model automatic creation process includes: determining whether or not a component to be determined is the conductive component determined as having the antenna operating portion; and creating the model to have a simplified shape except for the component to be determined if the component to be determined is the component determined as having the antenna operating portion, and wherein the electromagnetic field analysis process includes: performing electromagnetic field analysis on the created model.

According to the present disclosure, the model can be simplified and created from only the metal operating as the antenna. Accordingly, a calculation amount can be reduced so that analysis can be made easily even by a general-purpose PC.

In the method for operating the electromagnetic field simulator according to the present disclosure, the model creation information extraction process further includes: determining whether or not a portion corresponding to $\lambda/16$ to $\lambda$ of the evaluation frequency is present in the conductive component if the conductive component is present in the obtained target material information, the conductive component is determined as having the antenna operating portion if the portion corresponding to the $\lambda/16$ to $\lambda$ of the evaluation frequency is present in the conductive component, and the $\lambda$ is a wavelength of an electromagnetic wave corresponding to the evaluation frequency.

According to the present disclosure, the model can be simplified and created from only the metal operating as the antenna. Accordingly, a calculation amount can be reduced so that analysis can be made easily even by a general-purpose PC.

The electromagnetic field simulator according to the present disclosure is useful for design of an electronic apparatus.

While various embodiments have been described herein above, it is to be appreciated that various changes in form and detail may be made without departing from the spirit and scope of the invention(s) presently or hereinafter claimed.

This application is based on and claims priority from Japanese Patent Application No. 2018-050074 filed on Mar. 16, 2018, the entire contents of which are incorporated herein by reference.

The invention claimed is:

1. An electromagnetic field simulator connectable to an input device and a display device, the electromagnetic field simulator simulating an electromagnetic field about an electronic device, the electronic device being able to be mounted on a vehicle, the electromagnetic field simulator comprising:
a processor and a memory coupled to the processor, the memory storing a computer program that, when executed by the processor, causes the electromagnetic field simulator to:
perform a model creation information extraction process of extracting information for creation of a model;
perform a model automatic creation process of creating the model based on the extracted information; and
perform an electromagnetic field analysis process of performing electromagnetic field analysis on the created model,
wherein the model creation information extraction process comprises:
obtaining evaluation frequency information that indicates an evaluation frequency that is corresponding to a frequency of an electromagnetic wave which can be used, by the electronic device, for wireless communication with a device around the electronic device;
obtaining noise frequency information that indicates a noise frequency that is corresponding to a frequency of an electromagnetic wave which is possible to be emitted by a component, the component acting as a noise source and being to be mounted on the electronic device;
obtaining target material information which is related to the electronic device;
identifying a type of the electronic device based on the obtained target material information and determining whether or not at least one conductive component is present in the electronic device;
determining, based on the evaluation frequency and a type of the conductive component, whether or not the at least one conductive component has a radiation portion that operates as an antenna if the at least one conductive component is present in the electronic device, the wireless communication of the device around the electronic device being to be interfered by an electromagnetic wave which is emitted by the radiation portion when the at least one conductive component is mounted on the electronic device;
determining whether or not a division or multiplication of the noise frequency obtained by dividing or multiplying the noise frequency by any integer corresponds to the evaluation frequency; and
determining the noise source as a noise source for creation of the model if the division or multiplication of the noise frequency corresponds to the evaluation frequency, the noise source for creation of the model being corresponding to a component that is to be acting as a power feed point when the component is mounted on the electronic device, wherein the model automatic creation process comprises:
determining whether or not it is determined that at least one conductive component is present in the electronic device and any of the at least one conductive component has the radiation portion;
creating a model being used for simulating the electromagnetic field about the electronic device, the model being corresponding to the three-dimensional shape of the electronic device; and
creating the model by replacing a shape of each part other than at least one conductive component with a predetermined shape respectively, if it is determined that at least one conductive component is present in the electronic device and any of the at least one conductive component has the radiation portion, and
wherein the electromagnetic field analysis process comprises:
performing electromagnetic field analysis on the created model; and
outputting first information, second information, and third information,
wherein the first information indicating a content of a result of the electromagnetic field analysis;
the second information indicating where each of the at least one conductive component is to be mounted on the electronic device, the at least one conductive component determined as having the radiation portion; and
the third information indicating where each of the noise sources, being determined as the noise source for creation of the model, is to be mounted on the electronic device.

2. The electromagnetic field simulator according to claim 1,
wherein the model creation information extraction process further comprises:
determining whether or not a portion corresponding to $\lambda/16$ to $\lambda$ of the evaluation frequency is present in the conductive component if the conductive component is present in the electronic device, and
determining the conductive component as having the radiation portion if the portion corresponding to the $\lambda/16$ to $\lambda$ of the evaluation frequency is present in the conductive component, and
wherein the $\lambda$ is a wavelength of an electromagnetic wave corresponding to the evaluation frequency.

3. The electromagnetic field simulator according to claim 1,
wherein the electronic device is a device to be mounted on the vehicle.

4. The electromagnetic field simulator according to claim 1,
wherein a frequency for the component acting as the noise source is corresponding to one of an operating frequency of a crystal that is included in the component, and an operating frequency of an integrated circuit that is included in the component.

5. The electromagnetic field simulator according to claim 1,
wherein the target material information comprises one of a photograph of the electronic device, and three-dimensional computer-aided design information of the electronic device.

6. The electromagnetic field simulator according to claim 1,
wherein
the second information is displayed in the display device, the second information indicating the conductive component determined as having the radiation portion, and
the third information is displayed in the display device, the third information indicating & each of the noise sources determined as the noise source for creation of the model.

7. The electromagnetic field simulator according to claim 6,
wherein
the first information is displayed in the display device, the first information indicating the content of the a result of the electromagnetic field analysis.

8. The electromagnetic field simulator according to claim 1,
wherein the electromagnetic field analysis process further comprises:
reflecting the noise source determined as the noise source for creation of the model as a component that is to be acting as a power feed point when the component is mounted on the electronic device.

9. A method for operating an electromagnetic field simulator connectable to an input device and a display device, the electromagnetic field simulator simulating an electromagnetic field about an electronic device, the electronic device being able to be mounted on a vehicle, the method comprising:
performing a model creation information extraction process of extracting information for creation of a model;
performing a model automatic creation process of creating the model based on the extracted information; and
performing an electromagnetic field analysis process of performing electromagnetic field analysis on the created model,
wherein the model creation information extraction process comprises:
obtaining evaluation frequency information that indicates an evaluation frequency that is corresponding to a frequency of an electromagnetic wave which can be used, by the electronic device, for wireless communication with a device around the electronic device;
obtaining noise frequency information that indicates a noise frequency that is corresponding to a frequency of an electromagnetic wave which is possible to be emitted by a component, the component acting as a noise source and being to be mounted on the electronic device;
obtaining target material information which is related to the electronic device;
identifying a type of the electronic device based on the obtained target material information and determining whether or not at least one conductive component is present in the electronic device;
determining, based on the evaluation frequency and a type of the conductive component, whether or not the at least one conductive component has a radiation portion that operates as an antenna if the at least one conductive component is present in the electronic device, the wireless communication of the device around the electronic device being to be interfered by an electromagnetic wave which is emitted by the radiation portion when the at least one conductive component is mounted on the electronic device;

determining whether or not a division or multiplication of the noise frequency obtained by dividing or multiplying the noise frequency by any integer corresponds to the evaluation frequency; and determining the noise source as a noise source for creation of the model if the division or multiplication of the noise frequency corresponds to the evaluation frequency, the noise source for creation of the model being corresponding to a component that is to be acting as a power feed point when the component is mounted on the electronic device, wherein the model automatic creation process comprises:

determining whether or not it is determined that at least one conductive component is present in the electronic device and any of the at least one conductive component has the radiation portion;

creating a model being used for simulating the electromagnetic field about the electronic device, the model being corresponding to the three-dimensional shape of the electronic device; and creating the model by replacing a shape of each part other than at least one conductive component with a predetermined shape respectively, if it is determined that at least one conductive component is present in the electronic device and any of the at least one conductive component has the radiation portion, and wherein the electromagnetic field analysis process comprises:

performing electromagnetic field analysis on the created model; and outputting first information, second information, and third information, wherein the first information indicating a content of a result of the electromagnetic field analysis;

the second information indicating where each of the at least one conductive component is to be mounted on the electronic device, the at least one conductive component determined as having the radiation portion; and the third information indicating where each of the noise sources, being determined as the noise source for creation of the model, is to be mounted on the electronic device.

10. The method for operating the electromagnetic field simulator according to claim 9, wherein the model creation information extraction process further comprises:

determining whether or not a portion corresponding to $\lambda/16$ to $\lambda$ of the evaluation frequency is present in the conductive component if the conductive component is present in the electronic device, and determining the conductive component as having the radiation portion if the portion corresponding to the $\lambda/16$ to $\lambda$ of the evaluation frequency is present in the conductive component, and wherein the $\lambda$ is a wavelength of an electromagnetic wave corresponding to the evaluation frequency.

11. The method for operating the electromagnetic field simulator according to claim 9, wherein the second information is displayed in the display device, the second information indicating the conductive component determined as having the radiation portion, and the third information is displayed in the display device, the third information indicating each of the noise sources determined as the noise source for creation of the model.

12. A non-transitory computer readable medium storing a program causing a processor in an electromagnetic field simulator connectable to an input device and a display device, the electromagnetic field simulator simulating an electromagnetic field about an electronic device, the electronic device being able to be mounted on a vehicle, to execute:

a model creation information extraction process of extracting information for creation of a model;

a model automatic creation process of creating the model based on the extracted information; and an electromagnetic field analysis process of performing electromagnetic field analysis on the created model, wherein the model creation information extraction process comprises:

obtaining evaluation frequency information that indicates an evaluation frequency that is corresponding to a frequency of an electromagnetic wave which can be used, by the electronic device, for wireless communication with a device around the electronic device;

obtaining noise frequency information that indicates a noise frequency that is corresponding to a frequency of an electromagnetic wave which is possible to be emitted by a component, the component acting as a noise source and being to be mounted on the electronic device;

obtaining target material information which is related to the electronic device;

identifying a type of the electronic device based on the obtained target material information and determining whether or not at least one conductive component is present in the electronic device;

determining, based on the evaluation frequency and a type of the conductive component, whether or not the at least one conductive component has a radiation portion that operates as an antenna if the at least one conductive component is present in the electronic device, the wireless communication of the device around the electronic device being to be interfered by an electromagnetic wave which is emitted by the radiation portion when the at least one conductive component is mounted on the electronic device;

determining whether or not a division or multiplication of the noise frequency obtained by dividing or multiplying the noise frequency by any integer corresponds to the evaluation frequency; and determining the noise source as a noise source for creation of the model if the division or multiplication of the noise frequency corresponds to the evaluation frequency, the noise source for creation of the model being corresponding to a component that is to be acting as a power feed point when the component is mounted on the electronic device, wherein the model automatic creation process comprises:

determining whether or not it is determined that at least one conductive component is present in the electronic device and any of the at least one conductive component has the radiation portion;

creating a model being used for simulating the electromagnetic field about the electronic device, the model being corresponding to the three-dimensional shape of the electronic device; and creating the model by replacing a shape of each part other than at least one conductive component with a predetermined shape respectively, if it is determined that at least one conductive component is present in the electronic device and any of the at least one conductive component has the radiation portion, and wherein the electromagnetic field analysis process comprises:

performing electromagnetic field analysis on the created model; and outputting first information, second information, and third information, wherein the first information indicating a content of a result of the electromagnetic field analysis;

the second information indicating where each of the at least one conductive component is to be mounted on the electronic device, the at least one conductive component determined as having the radiation portion; and the third information indicating where each of the noise sources, being determined as the noise source for creation of the model, is to be mounted on the electronic device.

13. The non-transitory computer readable medium according to claim 12, wherein the model creation information extraction process further comprises:

determining whether or not a portion corresponding to $\lambda/16$ to $\lambda$ of the evaluation frequency is present in the conductive component if the conductive component is present in the electronic device, and determining the conductive component as having the radiation portion if the portion corresponding to the $\lambda/16$ to $\lambda$ of the evaluation frequency is present in the conductive component, and wherein the $\lambda$ is a wavelength of an electromagnetic wave corresponding to the evaluation frequency.

14. The non-transitory computer readable medium according to claim 12, wherein the second information is displayed in the display device, the second information indicating the conductive component determined as having the radiation portion, and the third information is displayed in the display device, the third information indicating each of the noise sources determined as the noise source for creation of the model.

* * * * *